United States Patent [19]
Baron

[11] Patent Number: 5,813,684
[45] Date of Patent: Sep. 29, 1998

[54] FRONT WHEEL SUSPENSION FOR A MOTORCYCLE

[75] Inventor: Guenter Baron, Olching, Germany

[73] Assignee: Bayersiche Motoren Werke Aktiengesellschaft, Munich, Germany

[21] Appl. No.: 607,314

[22] Filed: Feb. 26, 1996

[30] Foreign Application Priority Data

Feb. 24, 1995 [DE] Germany .................. 195 06 567.0

[51] Int. Cl.⁶ .................................................. B62K 25/08
[52] U.S. Cl. ................ 280/276; 180/219; 188/5
[58] Field of Search .................. 280/276, 277, 280/275, 283; 180/219

[56] References Cited

U.S. PATENT DOCUMENTS

| 4,159,123 | 6/1979 | Petty | 280/276 |
| 4,388,978 | 6/1983 | Fior | 180/219 |

FOREIGN PATENT DOCUMENTS

| 0399964 | 11/1990 | European Pat. Off. | 280/276 |
| 2 535 670 | 5/1984 | France. | |
| 2 539 375 | 7/1984 | France. | |
| 35 13 974 | 9/1986 | Germany. | |
| 43 11 537 | 10/1994 | Germany. | |
| 0296288 | 8/1928 | United Kingdom | 280/276 |

*Primary Examiner*—Anne Marie Boehler
*Attorney, Agent, or Firm*—Evenson, McKeown, Edwards & Lenahan P.L.L.C.

[57] ABSTRACT

The invention describes a front wheel suspension for motorcycles, in the case of which a telescopic fork is swivellably held on the vehicle body by way of a longitudinal control arm. In order to prevent an outward rotation of the telescopic fork during the compression of the front wheel, the invention provides a ball joint on the steering head which ball joint is held so that it can be rotated about a transverse axis. The rotating movement of the ball joint is initiated by way of a steering strut by the swivel movement of the longitudinal control arm. As a result of the rotatability of the ball joint, the damaging outward rotating of the telescopic fork is counteracted. In the ideal case, a parallel displacement of the telescopic fork is achieved during the compression of the front wheel.

11 Claims, 1 Drawing Sheet

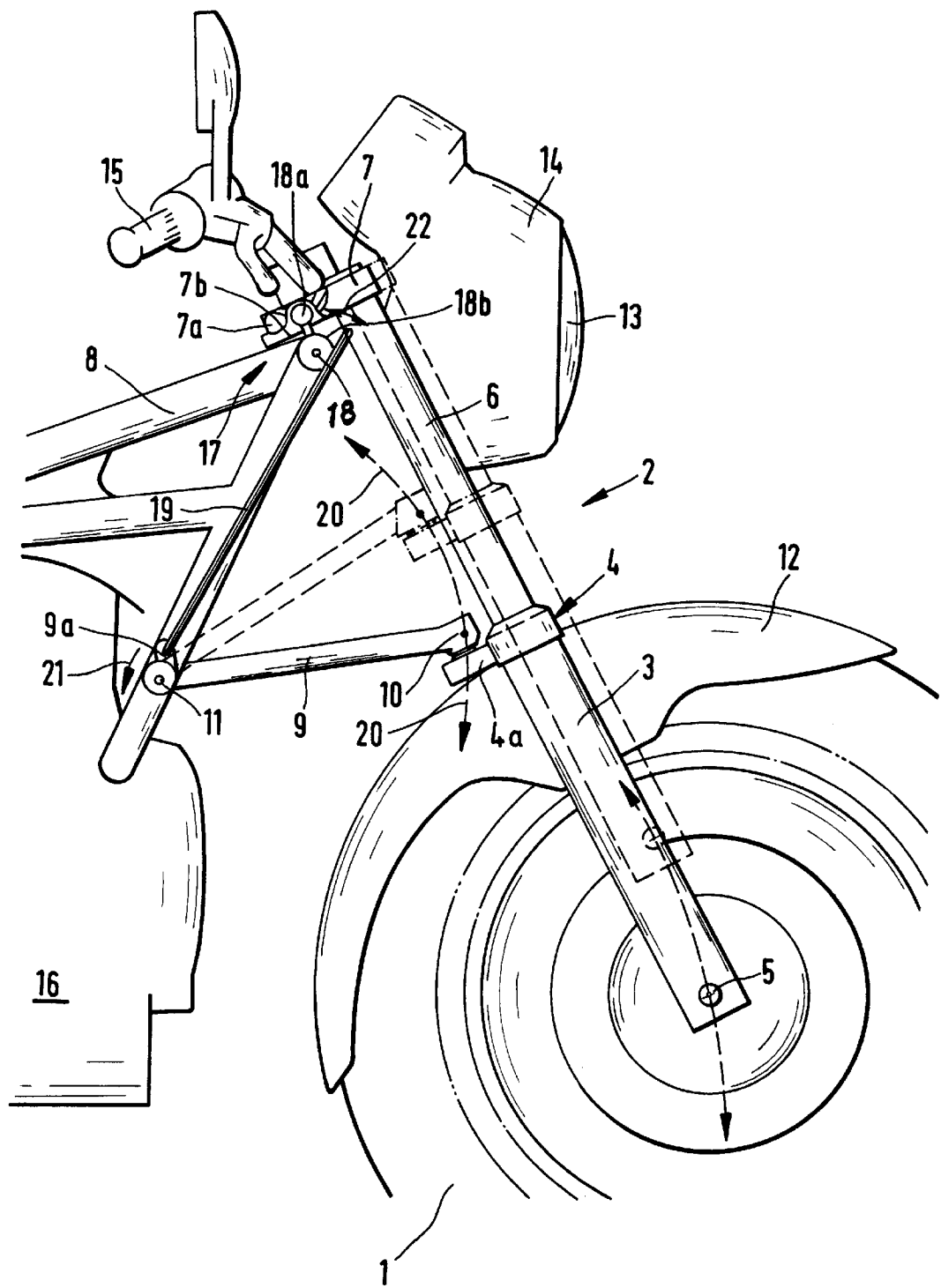

FRONT WHEEL SUSPENSION FOR A MOTORCYCLE

BACKGROUND AND SUMMARY OF THE INVENTION

This invention relates to a front wheel suspension for a motorcycle having a telescopic fork and, more particularly, to a front wheel suspension wherein the slide pipes which receive an axle shaft of the front wheel are connected with one another by a lower fork bridge. Vertical pipes, which can be axially displaced in the slide pipes, are held by way of a ball joint in a swivellable manner on a steering head fixed to the body. By way of another ball joint, a longitudinal control arm is applied to the fork bridge. The longitudinal control arm is swivellably disposed on the vehicle body by way of a hinge with an axis of rotation extending transversely with respect to the longitudinal axis of the motorcycle.

A known front wheel suspension is shown in the German Patent document DE 35 13 974 C1. In this known front wheel suspension, the telescopic fork held by the longitudinal control arm carries out a tilting movement about the upper bearing point, i.e., the ball joint on the steering head. The intensity of the tilting movement depends on the length of the longitudinal control arm and on the position of the above-mentioned point of rotation. The wheel bump curve resulting from this movement influences the directional control, the handling, the response of the telescopic fork and the anti-dive effect during braking of the motorcycle.

Another disadvantage of the known design is the result of the tilting movement of the fork which, depending on the control arm height, i.e., the distance from the point of rotation of the ball joint, is transmitted into the control arm. This results in an unpleasant swinging of the control arm ends during the compression of the front wheel.

There is therefore needed a front wheel suspension design such that the above-mentioned disadvantages will not occur or will occur only to an acceptably small extent.

According to the present invention, these needs are met by a front wheel suspension for a motorcycle having a telescopic fork wherein the slide pipes which receive an axle shaft of the front wheel are connected with one another by a lower fork bridge. Vertical pipes, which can be axially displaced in the slide pipes, are held by way of a ball joint in a swivellable manner on a steering head fixed to the body. By way of another ball joint, a longitudinal control arm is applied to the fork bridge. The longitudinal control arm is swivellably disposed on the vehicle body by way of a hinge with an axis of rotation extending transversely with respect to the longitudinal axis of the motorcycle. The ball joint assigned to the vertical pipes can be swivelled in an additional hinge about an axis of rotation which extends in parallel to the hinge of the longitudinal control arm. An end section of a steering strut is connected with the ball joint in an articulated manner and the opposite end section of the steering strut is connected with the longitudinal control arm in an articulated manner.

According to the present invention, the ball joint is therefore held in the steering head in a rotatable manner. As a result, it can counteract the swinging movement of the telescopic fork during the compression of the front wheel. The rotation of the ball joint is caused by a steering strut which is acted upon by the longitudinal control arm, which moves back and forth, and which steering strut transmits this movement to the ball joint. If the steering strut, the longitudinal control arm and the pivotal connecting points of the steering strut are dimensioned correspondingly, in an ideal case, a parallel displacement of the telescopic fork can be achieved during the compression of the front wheel. In such a case, neither the steering angle nor the caster will change. In addition, the annoying swinging of the control arm ends will no longer occur. The control arm height may therefore be selected independently in view of this construction of the front wheel suspension. Likewise, by means of the parallel displacement of the telescopic fork, a satisfactory anti-dive effect can be achieved during the braking.

In a preferred embodiment, an upper fork bridge connects the vertical pipes with one another. The fork bridge has a ball socket in which a ball of the resulting ball joint is disposed. The ball itself, in turn, is a part of a joint body which is rotatably disposed in the steering head.

In a further embodiment, the longitudinal control arm as well as the joint body of the ball joint have bearing lugs to which the end sections of the steering strut can be adjoined in an articulated manner. In order to obtain a countersteering movement of the ball joint which is as optimal as possible, it is also advantageous to arrange the fastening lug of the joint body relative to its axis of rotation opposite the spherical head.

In a further advantageous embodiment, the length of the steering strut may be changed as shown by 1. This may take place by manual or by electric means. In this manner, the caster of the front wheel can be changed in a targeted manner. As a result, the driving characteristics can be advantageously influenced during highspeed driving as well as during slow driving.

Finally, in a still further preferred embodiment, the ball joint can be laterally displaced in the steering head as shown by arrow 50. This has the advantage that a lateral swivelling-out of the fork is possible during a steering movement with the result of a displacement of the wheel contact area. Overturning moments may be positively influenced in this manner.

Other objects, advantages and novel features of the present invention will become apparent from the following detailed description of the invention when considered in conjunction with the accompanying drawings.

DESCRIPTION OF THE DRAWING

The single FIGURE is a schematic side view of a forward section of a motorcycle having a front wheel suspension according to the present invention.

DETAILED DESCRIPTION OF THE DRAWING

In the single FIGURE, the drawing schematically shows the forward section of a motorcycle. A front wheel 1 is illustrated which is held in a rotatable manner in a telescopic fork which, as a whole, has the reference number 2. For this purpose, the telescopic fork 2 has two slide pipes 3 (only one of the slide pipes 3 is shown in the drawing due to the side view). A fork bridge 4 connects the slide pipes 3 above the front wheel 1. On their lower end, the slide pipes 3 receive an axle shaft 5 on which the front wheel 1 rotates, as mentioned above.

Vertical pipes 6 (only one is shown) are held in the slide pipes 3 in an axially slidable manner. On their upper end, the vertical pipes 6 are connected with one another by another fork bridge 7. For reasons of completeness, it should be mentioned that a fender 12 partially covers the front wheel 1 and is arranged between the wheel 1 and the motorcycle body. In addition, a headlight 13 with a covering 14, as well as a handle-bar mounting 15 are fastened on the telescopic fork. Finally, a drive unit 16 is also indicated in the drawing. To this extent, the telescopic fork 2 corresponds to the front wheel forks which are currently used in all common motorcycle makes.

The upper fork bridge 7 has a lengthening 7a (shown in cross-section) with a ball socket 7b. The ball socket 7b is part of a ball joint 17 by which the telescopic fork 2 is disposed on the vehicle body. In the drawing, the vehicle body is represented by a steering head 8 which is part of the actual motorcycle frame.

In addition, the term "fixed to the body" within the scope of the application is to be understood in the sense of parts, such as drive assemblies, etc. fixed by or on the vehicle frame. Finally, the telescopic fork 2 is fixed on the vehicle frame, which has no reference number, by way of a longitudinal control arm 9. In this case, by way of a ball joint 10, the longitudinal control arm is applied to a lengthening 4a of the lower fork bridge 4. Its other end is swivellably disposed on the vehicle frame by way of a hinge 11 whose axis of rotation extends transversely with respect to the longitudinal axis of the motorcycle and into the plane of the drawing.

The ball socket 7b is part of the above-mentioned ball joint 17. The joint body 18 has a spherical head 18a which is disposed in the ball socket 7b and, together with it, therefore forms the ball joint 17. The joint body 18, in turn, is rotatably disposed in the steering head 8. The axis of rotation in this case extends transversely with respect to the longitudinal direction of the motorcycle and in parallel to the axis of the hinge 11 assigned to the longitudinal control arm 9. Furthermore, a bearing lug 18b is molded out on the joint body 18 approximately at a right angle with respect to the spherical head 18a. The bearing lug 18b forms an angle lever together with the ball 18a.

In an articulated manner, a steering strut 19 is applied to the bearing lug 18b by means of its one end section and to a bearing lug 9a of the longitudinal control arm 9 by means of its other end section. By means of this connection, a swivel motion is forced upon the joint body 18 or the ball joint 17. This swivel motion will be described in detail in the following.

During the compression of the front wheel 1, the longitudinal control arm 9 swivels upwards into the position indicated by a broken line. The swivel motion is indicated by a double arrow 20. In this case, the longitudinal control arm 9 describes an orbit and, at least initially presses the telescopic fork 2 toward the front in the driving direction. However, at the same time, the longitudinal control arm 9 moves its bearing lug 9a counterclockwise. This pulls the steering strut 19 downward and to the rear corresponding to the moving path. In this case, the other end section of the steering strut 19 swivels the joint body 18 clockwise and in this manner presses the spherical head 18a forward. During its movement, this spherical head 18a, by way of the ball socket 7a, takes along the upper fork bridge 7 so that, on the whole, the upper section of the telescopic fork 2 also moves forward in the vehicle direction. The individual moving paths are indicated by arrows 21, 22.

In the case of a corresponding dimensioning, a parallel displacement of the telescopic fork 2 toward the front is achieved in this manner, as indicated in the drawing by the broken lines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A front wheel suspension for a motorcycle having a telescopic fork, comprising:

slide pipes, which receive an axle shaft of a front wheel, are connected with one another via a lower fork bridge;

vertical pipes arranged to be axially displaced in said slide pipes, said vertical pipes being held via a first ball joint in a swivellable manner;

a longitudinal control arm applied to the lower fork bridge via a second ball joint, said longitudinal control arm being swivellably disposable on a body of the motorcycle via a first hinge having an axis of rotation extending transversely with respect to a longitudinal axis of the control arm;

wherein said first ball joint coupled with said vertical pipes is swivellable via an additional hinge about an axis of rotation extending in parallel to the axis of rotation of said first hinge; and a steering strut having a first end section connected with said first ball joint in an articulated manner and an opposite end section connected with said longitudinal control arm in an articulated manner.

2. The front wheel suspension according to claim 1, wherein said first ball joint comprises:

a ball socket molded out of an upper fork bridge;

a spherical head which is received in said ball socket, said spherical head being a component of a joint body which is rotatable in a steering head of the motorcycle.

3. The front wheel suspension according to claim 2, wherein said joint body includes a bearing lug coupling with said steering strut on a side opposite that of said spherical head relative to the axis of rotation.

4. The front wheel suspension according to claim 2, wherein said longitudinal control arm includes a hinge lug for fixedly coupling with said steering strut in an area of said first hinge.

5. The front wheel suspension according to claim 3, wherein said longitudinal control arm includes a hinge lug for fixedly coupling with said steering strut in an area of said first hinge.

6. A front wheel suspension for a motorcycle having a telescopic fork with vertical pipes axially displaceable in slide pipes, comprising:

a longitudinal control arm having a first end coupling with said slide pipes and an opposite end swivellably disposable on a body of the motorcycle about a first axis of rotation extending transversely with respect to a longitudinal axis of the control arm;

a ball joint coupled with said vertical pipes and being swivellable about an axis of rotation extending in parallel to said first axis of rotation of said longitudinal control arm; and a steering strut having a first end section coupled with said ball joint in an articulated manner and an opposite end section coupled with said longitudinal control arm in an articulated manner.

7. A motorcycle, comprising:

a body of the motorcycle; and a front wheel suspension having a telescopic fork, said front wheel suspension including:

(a) slide pipes, which receive an axle shaft of a front wheel, are connected with one another via a lower fork bridge;

(b) vertical pipes arranged to be axially displaced in said slide pipes, said vertical pipes being held via a first ball joint in a swivellable manner on a steering head fixed to the body of the motorcycle;

(c) a longitudinal control arm applied to the lower fork bridge via a second ball joint, said longitudinal control arm being swivellably disposed on the body via a first hinge having an axis of rotation extending transversely with respect to a longitudinal axis through the motorcycle;

wherein said first ball joint holding said vertical pipes is swivellable via an additional hinge about an axis of rotation extending in parallel to the axis of rotation of said first hinge; and (d) a steering strut having a first end section connected with said first ball joint in an articulated manner and an opposite end section connected with said longitudinal control arm in an articulated manner.

8. The motorcycle according to claim 7, wherein said first ball joint comprises:

a ball socket molded out of an upper fork bridge;

a spherical head which is received in said ball socket, said spherical head being a component of a joint body which is rotated in the steering head of the motorcycle.

9. The motorcycle according to claim 8, wherein said joint body includes a bearing lug coupling with said steering strut on a side opposite that of said spherical head relative to the axis of rotation.

10. The motorcycle according to claim 8, wherein said longitudinal control arm includes a hinge lug for fixedly coupling with said steering strut in an area of said first hinge.

11. The motorcycle according to claim 9, wherein said longitudinal control arm includes a hinge lug for fixedly ling with said steering strut in an area of said first hinge.

* * * * *